United States Patent
Vaccari

(10) Patent No.: US 12,324,411 B2
(45) Date of Patent: Jun. 10, 2025

(54) MODULAR FRAME EXPANDABLE TO FORM A PET'S CAGE

(71) Applicant: FERPLAST S.P.A., Castelgomberto (IT)

(72) Inventor: Nicola Vaccari, Castelgomberto (IT)

(73) Assignee: FERPLAST S.P.A., Castelgomberto (IT)

( * ) Notice: Subject to any disclaimer, the term of this patent is extended or adjusted under 35 U.S.C. 154(b) by 118 days.

(21) Appl. No.: 17/075,676

(22) Filed: Oct. 20, 2020

(65) Prior Publication Data

US 2021/0112772 A1 Apr. 22, 2021

(30) Foreign Application Priority Data

Oct. 21, 2019 (IT) .................. 102019000019445

(51) Int. Cl.
  *A01K 1/03* (2006.01)
  *F16B 5/00* (2006.01)

(52) U.S. Cl.
  CPC .............. *A01K 1/03* (2013.01); *F16B 5/0012* (2013.01)

(58) Field of Classification Search
  CPC .......... A01K 1/03; A01K 1/033; A01K 1/034; A01K 1/035; F16B 5/0028; F16B 5/0621; F16B 5/0614; F16B 5/0635; F16B 5/0012
  USPC .................. 119/452, 472–474, 498
  See application file for complete search history.

(56) References Cited

U.S. PATENT DOCUMENTS

| | | | | |
|---|---|---|---|---|
| 3,047,183 A | * | 7/1962 | Papa | F16B 5/0614 D11/155 |
| 3,082,739 A | * | 3/1963 | Schloemer | A01K 5/01 119/58 |
| 3,160,280 A | * | 12/1964 | Burch | H02B 1/052 52/290 |
| 4,193,584 A | * | 3/1980 | Wieser | E04H 17/168 119/513 |
| 4,917,047 A | * | 4/1990 | Wazeter, III | A01K 1/03 119/474 |
| 5,058,863 A | * | 10/1991 | Maffet | F16B 5/0685 256/26 |
| 5,497,728 A | * | 3/1996 | Watanabe | A01K 1/033 119/452 |
| 6,021,739 A | * | 2/2000 | Allen | A01K 1/034 119/458 |
| 6,763,784 B1 | * | 7/2004 | Liu | A01K 31/08 119/452 |

(Continued)

FOREIGN PATENT DOCUMENTS

| | | | | |
|---|---|---|---|---|
| DE | 20218759 U1 | * | 2/2003 | ......... A47B 88/0003 |
| JP | 3212484 U | * | 9/2017 | |

*Primary Examiner* — Joshua J Michener
*Assistant Examiner* — Nicole Paige Maccrate
(74) *Attorney, Agent, or Firm* — ORBIT IP, LLP

(57) ABSTRACT

A modular frame expandable to form a pet's cage comprises a plurality of modules each of which comprises a substantially quadrangular vertical wall, said modules being arranged adjacently to each other to define the outer shape of the cage, and wherein each vertical edge of each module comprises connecting elements adapted to allow the connection and retention of each vertical wall of a module to a vertical wall of another adjacent module. The modular frame is expandable on a horizontal plane according to a predetermined configuration to form a pet's cage having predetermined shape and dimensions.

10 Claims, 10 Drawing Sheets

(56) References Cited

U.S. PATENT DOCUMENTS

| | | | | |
|---|---|---|---|---|
| 6,832,580 B2* | 12/2004 | Marchioro | | A01K 31/08 D30/114 |
| 6,871,614 B2* | 3/2005 | Goldwitz | | A01K 1/00 52/79.5 |
| 7,316,203 B2* | 1/2008 | Marchioro | | A01K 31/08 119/474 |
| 7,584,720 B1* | 9/2009 | Jackson | | A01K 1/033 119/482 |
| 7,827,939 B2* | 11/2010 | Yang | | A01K 31/08 119/474 |
| 8,240,274 B2* | 8/2012 | Greene | | A01K 1/033 119/474 |
| 2001/0054394 A1* | 12/2001 | Marchioro | | A01K 31/06 119/452 |
| 2002/0117118 A1* | 8/2002 | Marchioro | | A01K 31/06 119/474 |
| 2004/0144327 A1* | 7/2004 | Marchioro | | B65D 7/32 119/452 |
| 2006/0130774 A1* | 6/2006 | Chiang | | A01K 1/03 119/455 |
| 2006/0225663 A1* | 10/2006 | Chiang | | A01K 63/003 119/452 |
| 2007/0000447 A1* | 1/2007 | Jakubowski | | A01K 1/034 119/453 |
| 2008/0236510 A1* | 10/2008 | Silverman | | A01K 31/08 206/509 |
| 2009/0288613 A1* | 11/2009 | Ho | | A01K 31/002 119/482 |
| 2009/0314220 A1* | 12/2009 | Groh | | A01K 1/034 119/502 |
| 2010/0223866 A1* | 9/2010 | Melville | | A01K 1/03 52/282.1 |
| 2010/0300371 A1* | 12/2010 | Oeltjen | | A01K 1/034 119/501 |
| 2014/0034525 A1* | 2/2014 | Wolf | | A01K 1/034 53/473 |
| 2015/0208607 A1* | 7/2015 | Vaccari | | A01K 1/031 119/455 |
| 2015/0216139 A1* | 8/2015 | Drake | | A01K 1/033 119/484 |
| 2015/0237822 A1* | 8/2015 | Jason | | A01K 1/0125 119/165 |
| 2016/0192616 A1* | 7/2016 | Kitchen | | A01K 1/034 119/485 |
| 2017/0020102 A1* | 1/2017 | Weingart | | A01K 1/03 |
| 2017/0328390 A1* | 11/2017 | Evans | | F16B 2/22 |
| 2018/0035635 A1* | 2/2018 | Hutchinson | | A01K 63/003 |
| 2018/0064245 A1* | 3/2018 | Huang | | A47B 47/0033 |
| 2019/0038036 A1* | 2/2019 | Squires | | A47C 17/66 |

* cited by examiner

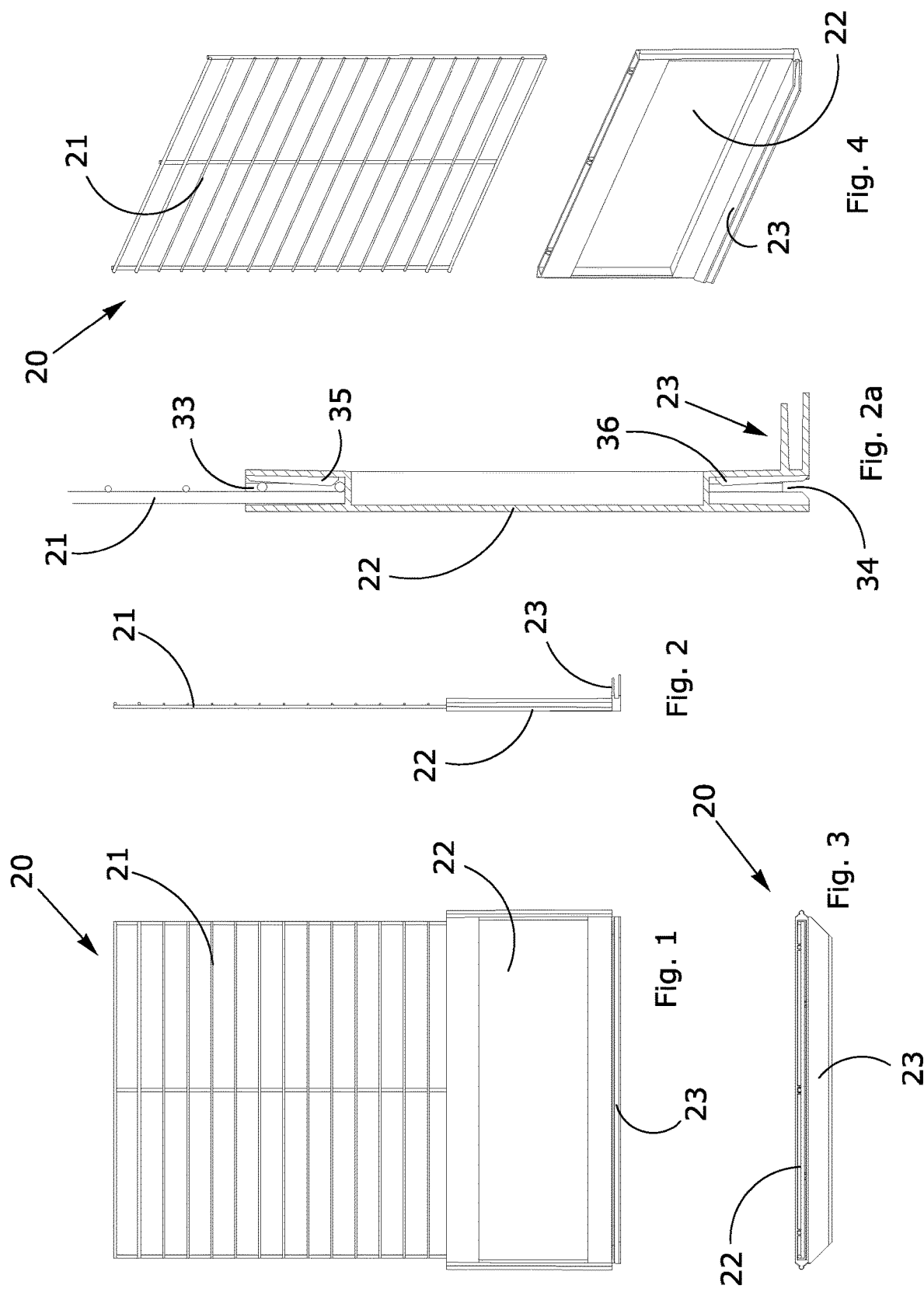

MODULAR FRAME EXPANDABLE TO FORM A PET'S CAGE

FIELD OF APPLICATION

The present invention relates to a modular frame expandable to form a cage used for the containment and transportation of pets, in particular for rabbits or guinea pigs, but also for the containment and transportation of dogs, cats or other animals.

According to one aspect, the cage according to the invention has a module represented by a closed and flat lower panel, advantageously made of plastic material associated with an upper mesh grid panel. This module, joined by vertical connecting elements to other identical or similar modules, and possibly associated with base and cover elements, allows a cage frame to be obtained that is expandable in multiple configurations which are chosen according to customisable needs.

With respect to the known solutions, the cage according to the invention has the advantage of being able to arrange adjacently and join together, through vertical connecting elements, a plurality of modules in order to obtain a cage of the desired configuration having an expandable modular frame.

The present invention is advantageously applied in the sector of components and accessories for pets, in particular in the sector of cages for the containment and transportation of pets such as rabbits or guinea pigs or other animals.

BACKGROUND

The use of cages is known, represented by containment structures for pets constituted by a base, a roof and four vertical walls arranged orthogonally adjacent. Each of said components is made with different techniques, also based on use, but generally the vertical walls, as well as the base and the roof, are mostly made using grids formed by a plurality of horizontal and vertical metal wires which are spaced so as to form meshes or grids which prevent the passage of the contained animal.

The base generally has the shape of a tray placed below the grid and serves as a basin for the bedding, composed of a sandy or granular material which, in addition to absorbing excrement, provides a warm and comfortable environment for the animal.

A common problem encountered in the traditional type of cages for rabbits or other pets lies in the fact that the formats and dimensions are rigid and not modifiable, thus not adapted, for example, to the case in which cages of customisable format are preferred or the case in which it is necessary to expand the typically available spaces for an increased number of animals.

The only possibility in these cases is to replace the cage with other cages of larger formats, even if this does not completely solve the problem because many domestic spaces do not have enough extra space to accommodate a large fixed cage, or also because the number of animals contained can also change again, in particular it can decrease due to for example the death of one or more animals, therefore the previously expanded spaces can then become excessive.

Document US 2008/0236510 A1 discloses a modular cage system, for example, for housing plants and/or animals. In this case the module consists of a fixed frame having a plurality of vertical and horizontal rods, and a plurality of connectors adapted to connect the horizontal and vertical rods together. The rods include protrusions or longitudinal ribs adapted to engage a plurality of panels. The panels include first ends adapted to rotatably engage a rib of a rod and a second end having a releasable locking mechanism adapted to engage a rib of a rod. Thus, the modular cage is defined by a frame comprising a plurality of horizontal and vertical rods which are joined together by end angular elements, which allow the cage to expand by connecting to further horizontal and vertical rods. Thus, the modularity of the system is defined by an entire cage which is arranged adjacently to an additional cage through shared horizontal and vertical rods. This system is complicated because each module essentially consists of an entire cage portion and always occupies a fixed and predetermined volume. Therefore, each module occupies a volume defined by the three dimensions of the cage, which limits the possibilities of expanding the cage itself in different directions depending on the space available. Furthermore, if the system is also to be expanded vertically, the horizontal rods can engage spaces inside the cage and hinder the movement of the animals enclosed therein.

Document U.S. Pat. No. 6,832,580 B2 describes a further modular cage in which the module is of fixed dimensions and has a predetermined volume, and comprises a frame having a plurality of vertical and horizontal rods interconnected by angular elements and mesh grid panels which form the walls of the module itself.

Even in this case, the horizontal rods are an obstacle to the movement of the animals if two cage modules are superimposed on each other. And the volume of each module also constitutes, as in the previous case, a limitation on the possibilities of expanding the cage in different directions depending on the space available.

A further example of a modular cage designed according to a similar concept is given by document U.S. Pat. No. 6,763,784 B1, where the cage comprises a plurality of vertical and horizontal rods joined together by angular elements, and the walls consist of mesh grids.

The drawbacks and disadvantages of this cage are the same as those highlighted above.

DESCRIPTION OF THE INVENTION

The present invention aims to provide a modular frame expandable to form a pet's cage, in particular for rabbits, guinea pigs or other animals, which allows exploiting the space available for the expansion of the cage in a much more efficient manner than the solutions known in the art, and which at the same time offers a volume entirely usable by the animal for the movements thereof inside the cage, without the presence of horizontal rods which constitute an impediment and potential source of danger for the animal.

One aspect of the invention therefore provides a modular frame expandable to form a cage for rabbits or other pets which is very simple in concept and can use a modular system to solve the drawbacks described above.

A modular frame expandable to form a cage for rabbits or similar pets according to one embodiment may have the features described in the main claim.

The dependent claims delineate further advantageous embodiments of the invention.

The main advantages of the present invention, in addition to all those deriving from the constructive simplicity thereof, relate firstly to the fact that the space available for the animal can be configured to suit customised needs, through the use of modules which can be associated with each other to form an expandable modular frame, to obtain cages with most varied configurations of the spaces, in which the interior spaces of the cage are totally free and not occupied by frame elements which, as occurs in the solutions known in the art, prevent or limit the free movement of the animal inside the cage.

The solution described in the present invention exploits the constructive system based on very simple modules which can be disassembled and assembled to obtain a plurality of desired configurations having constantly different shapes and sizes.

The modular frame expandable to form a cage according to the invention uses a base module comprising a vertical wall of the cage, which is joined and retained along a vertical edge of another adjacent base module through the use of appropriate fixing elements.

In a typical embodiment, each module (vertical wall) of the modular frame expandable to form a cage comprises an upper grid portion, i.e., comprises a mesh which is advantageously metallic, and a flat bottom portion, i.e., comprising a panel advantageously made of plastic material.

Moreover, according to an advantageous embodiment, each module (vertical wall) of the expandable modular frame of the cage according to the present invention can be coupled to a further module through a connecting element which joins two horizontal edges of two modules superimposed on each other, which opens the possibility of expanding the expandable modular frame forming the cage to form a multi-story structure, in which at least one base panel has an opening which allows the passage of the animal from one story to another, for example through a ladder.

According to one advantageous embodiment, temporary fixing elements are provided between the various modules, which may comprise guides or angular blocks.

The expandable modular frames according to the present patent disclosure have a great advantage with respect to the solutions known in the art, in particular that of allowing an expandability of the cage frame both horizontally and vertically and according to different shapes and configurations. This is because the solutions known in the art are based on modules comprising a fixed frame provided with vertical and horizontal rods, instead of with a modular frame that is expandable in any direction.

In fact, it is possible to flank and/or overlap several adjacent modules until obtaining a single cage (and not the joining of numerous cages as provided by the known solutions) of dimensions corresponding to different configuration needs depending on the available spaces.

ILLUSTRATION OF THE DRAWINGS

Further features and advantages of the invention will become apparent from reading the following description of an embodiment of the invention provided by way of non-limiting example, with the aid of the drawings illustrated in the appended tables of drawings, in which:

FIGS. 1 to 4 show schematic views highlighting the configuration of a module of an expandable modular frame according to the invention, seen from different angles;

FIG. 2a is a detailed section view taken from the section of FIG. 2;

Figure 12:
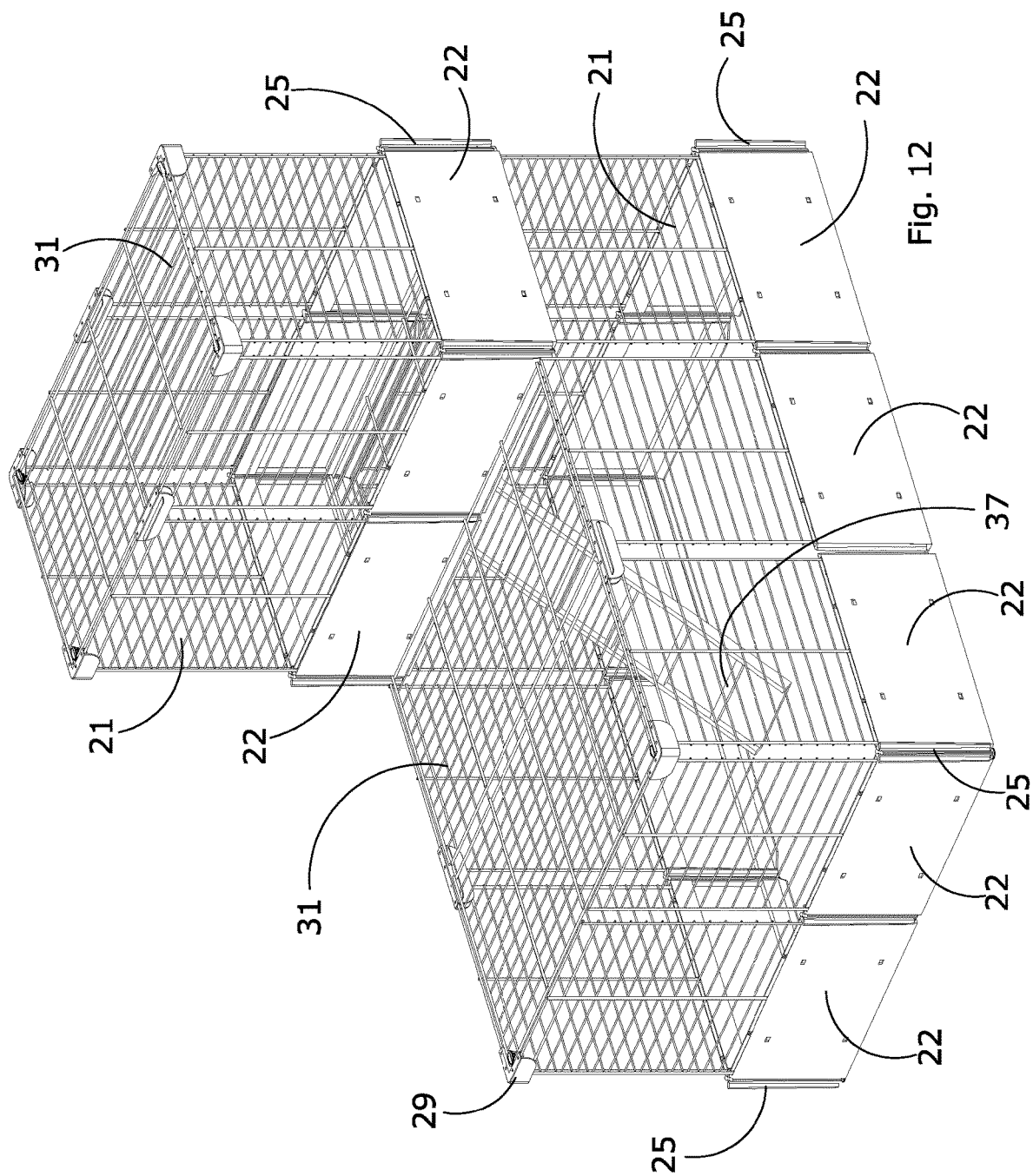
Figure 13:
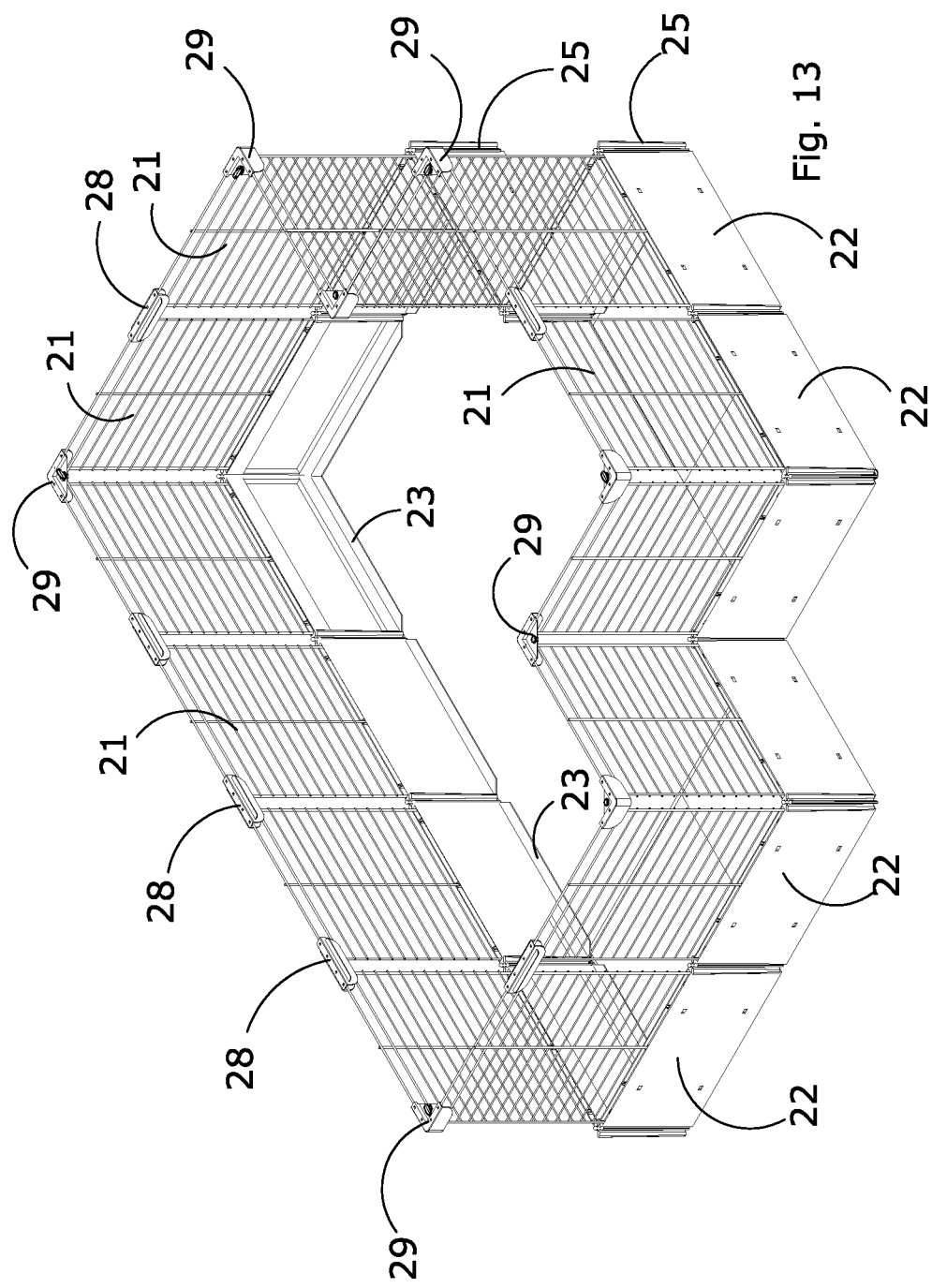
Figure 14:
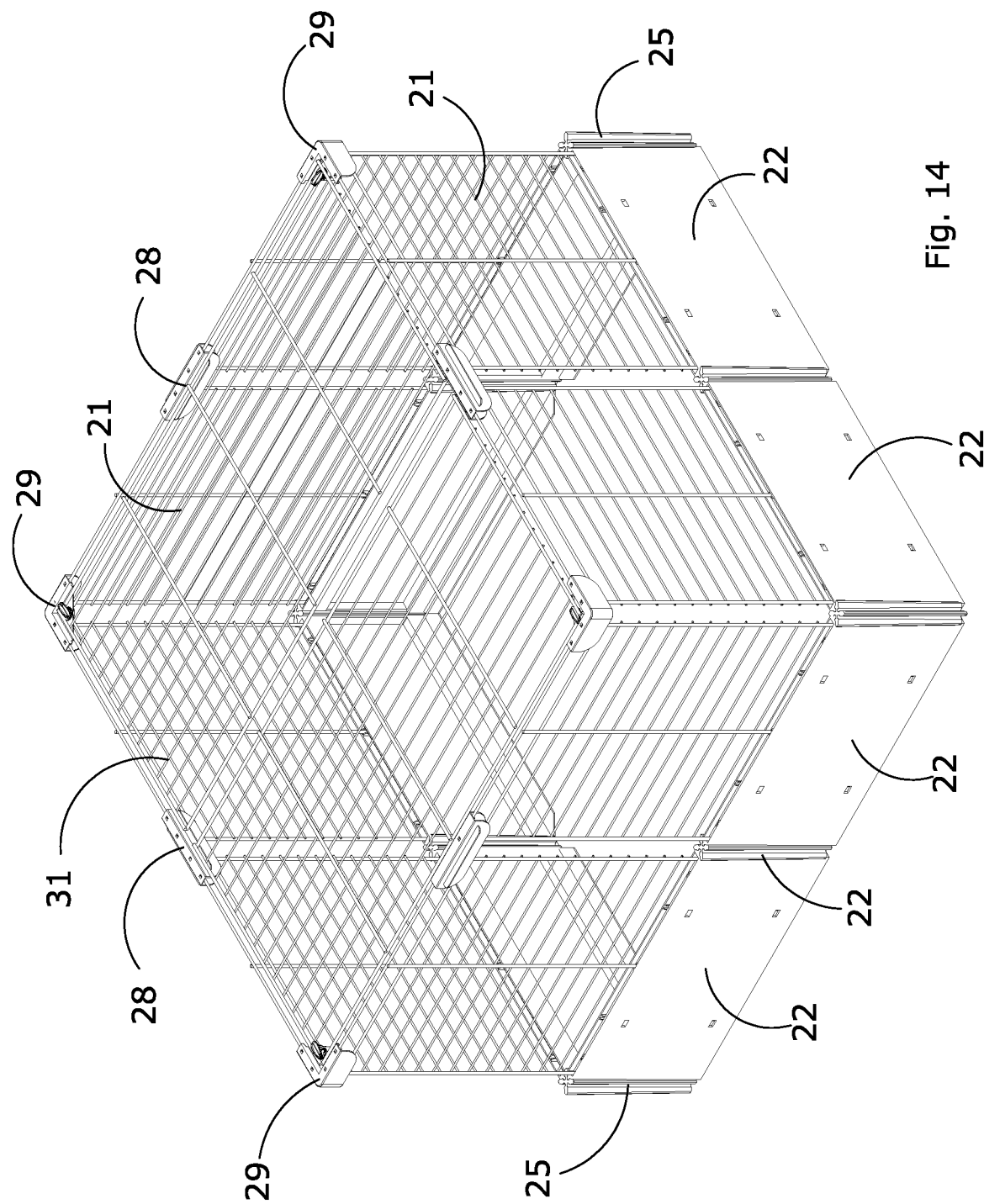
Figure 15:
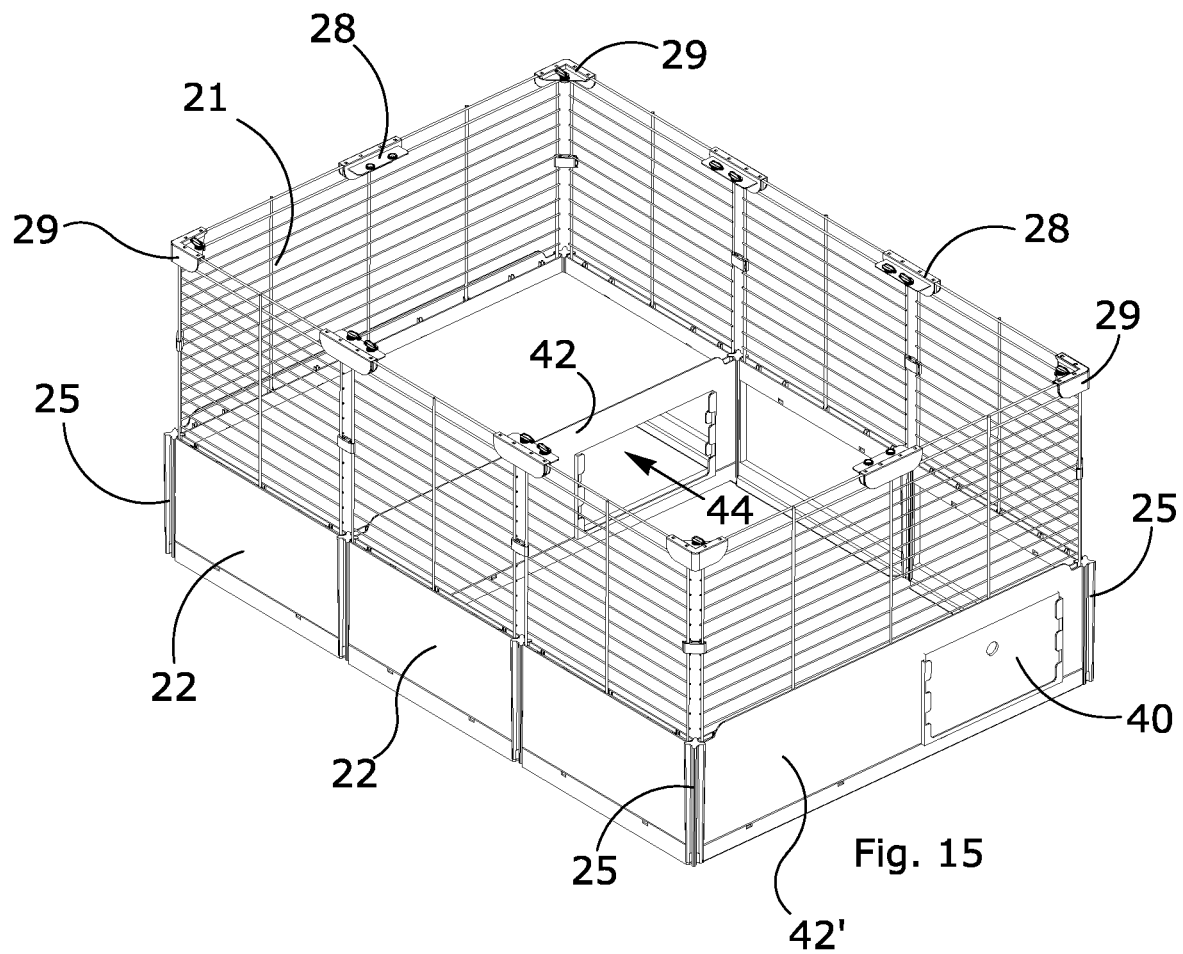
Figure 16:
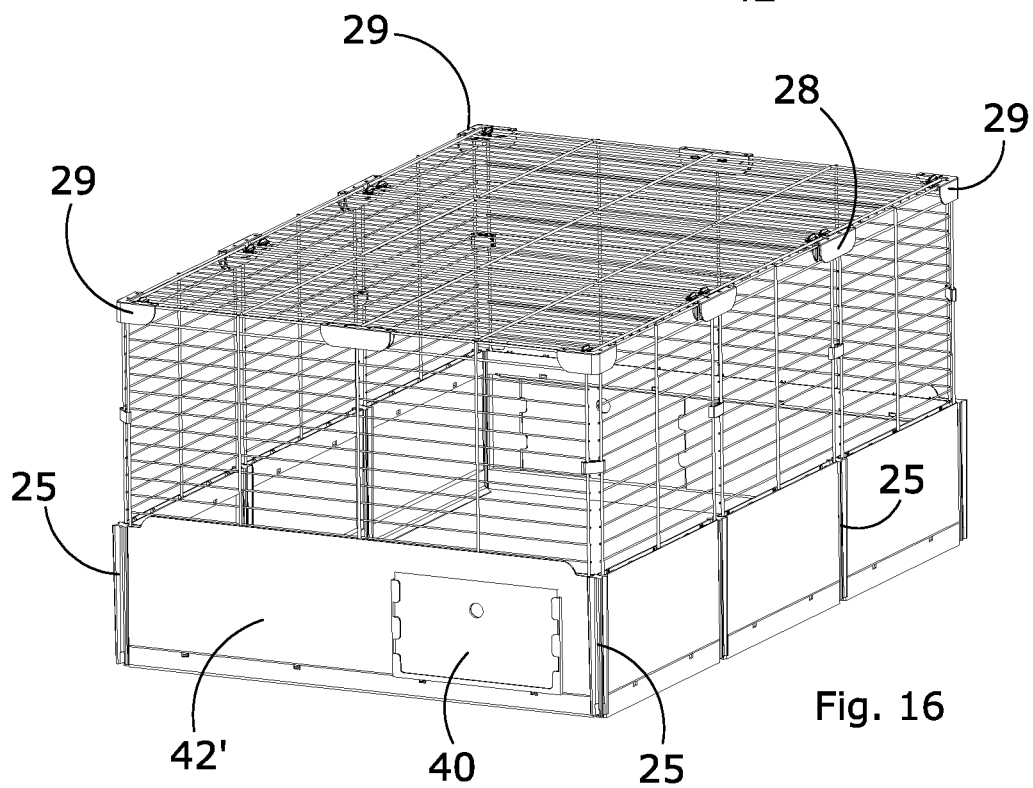
Figure 17:
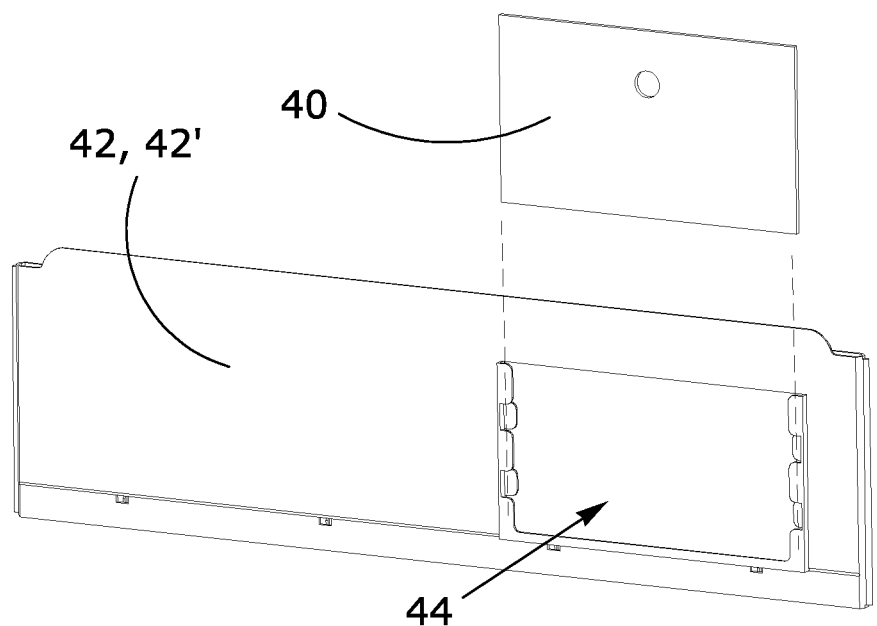
Figure 19:
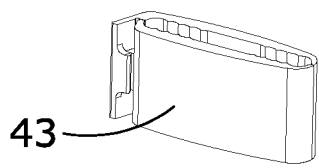
Figure 18:
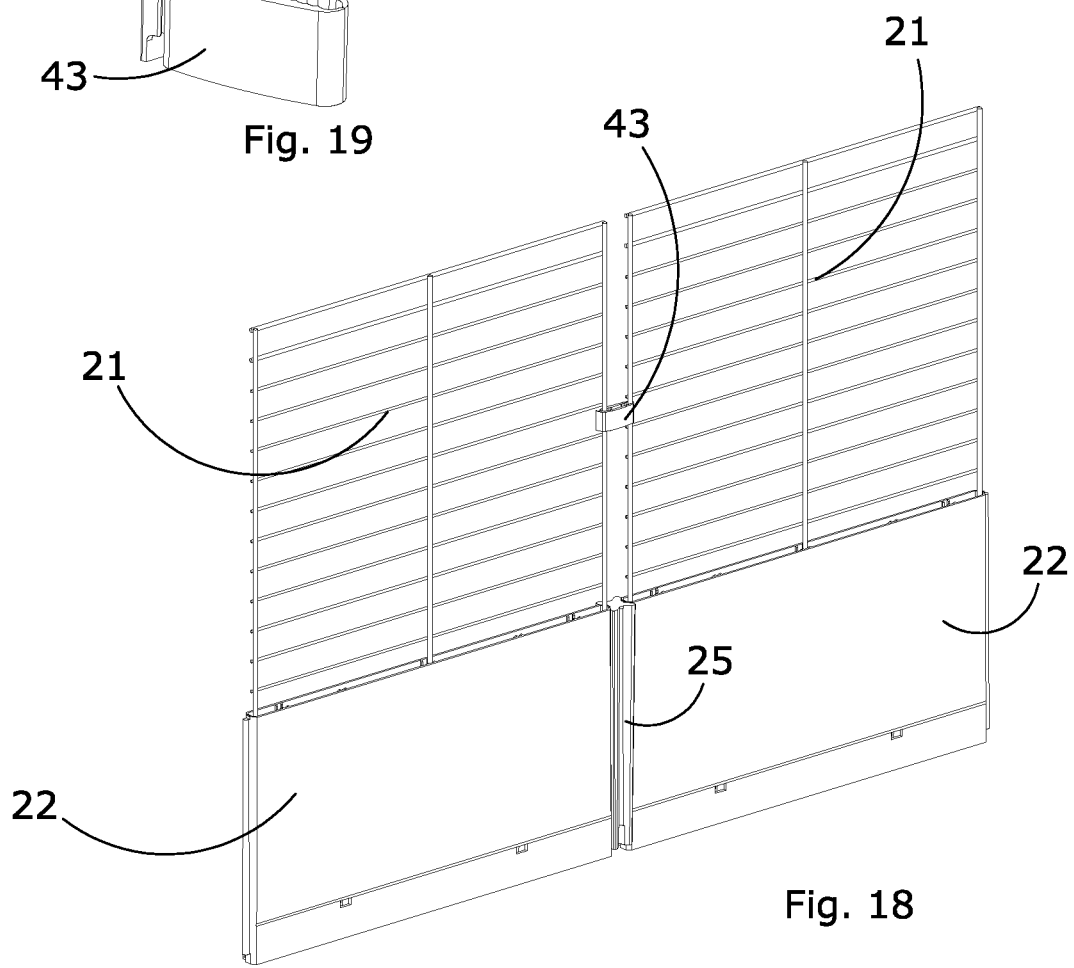

FIG. 12 refers to a view concerning a further solution of a cage formed by means of the connection of modules partly arranged adjacently and partly superimposed to obtain a cage configuration with two levels;

FIG. 13 relates to a further solution of the modular frame expandable on a horizontal plane obtained by means of the connection of adjacent modules in a mixed arrangement to form a cove along one side of the cage;

FIG. 14 shows a cage constituted by eight modules arranged adjacent to one another, as well as by a mesh grid element forming the roof of the cage itself;

FIG. 15 shows a cage in which an internal partition wall is present, in which the lower part of one side of the cage comprises a panel having a width twice that of a module and being provided with an access door;

FIG. 16 shows a further type of cage, this also being provided with a panel having a width twice that of a module and provided with an access door;

FIG. 17 shows a panel provided with a removable access door;

FIG. 18 illustrates a pair of adjacent modules with a joining element between the lower panels and a further connecting element between the upper grids; and FIG. 19 shows the connecting element of FIG. 18 in further detail.

DESCRIPTION OF AN EMBODIMENT OF THE INVENTION

Referring to FIG. 1, the reference number 20 indicates a module belonging to an expandable modular frame according to the invention, adapted to form a vertical wall portion of a cage for rabbits or other pets with a customised and variable configuration in which the modular frame is expandable on a horizontal plane.

According to the embodiment shown in FIGS. 1 to 4, each substantially quadrangular module 20 comprises an upper portion, generally including a metallic mesh 21 having a generally quadrangular shape, and a lower portion generally comprising a flat and closed panel 22 advantageously made of plastic material, having substantially the same dimensions in width as the upper portion 21.

Figure 7:
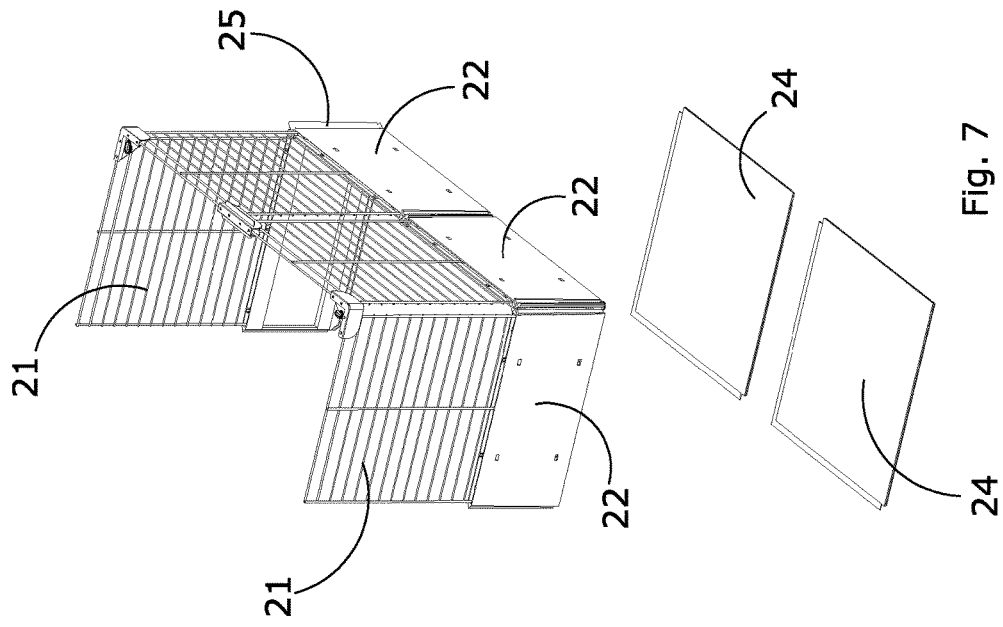
FIGS. 6 and 7 show views which relate to further configurations of modules arranged adjacently to obtain cages of variable type defined by expandable modular frames on a horizontal plane according to needs.
Figure 6:
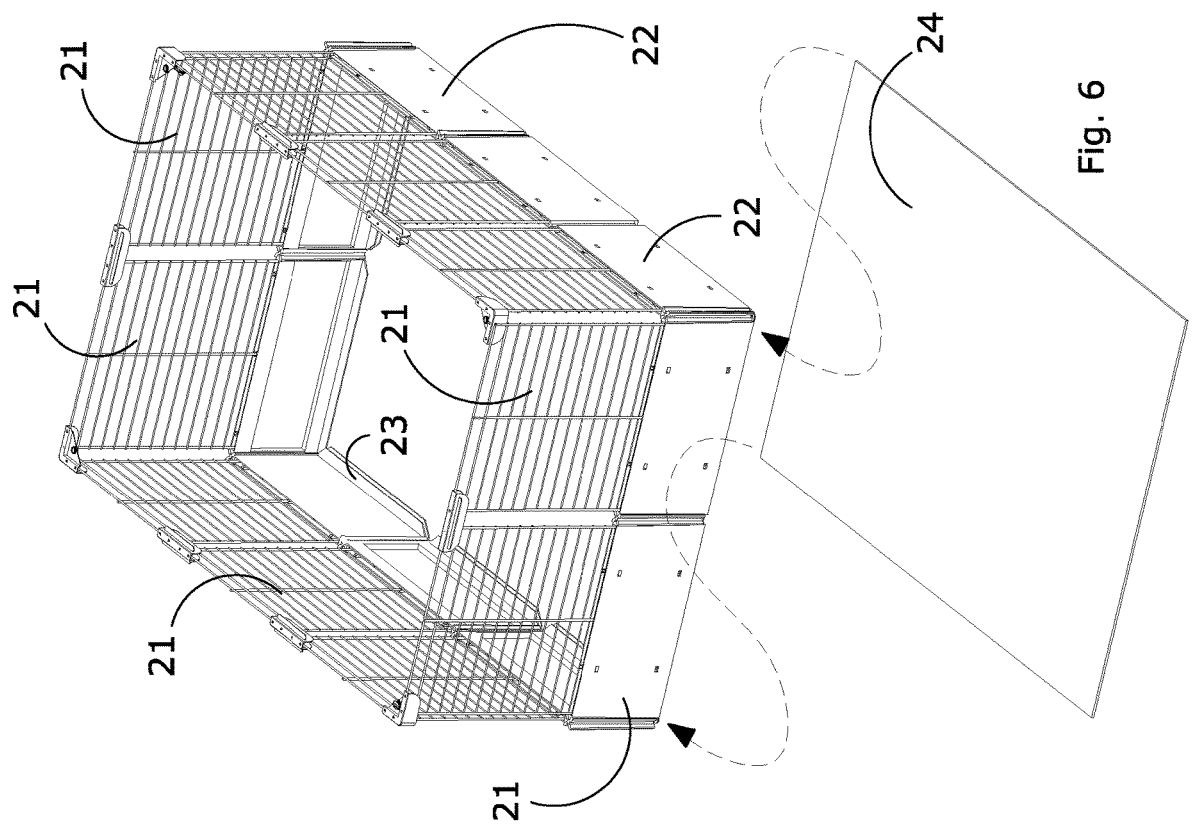

According to an embodiment, the panel 22 is provided, at the lower side thereof, with a border 23 projecting orthogonally towards the inside of the cage, formed by a pair of parallel superimposed flaps which define a channel adapted to receive and retain one or more of the base panels 24 in a horizontal arrangement, as represented in FIGS. 6 and 7.

The pair of flaps which form the border 23 are spaced at a distance corresponding to the thickness of the base panel 24, so that the latter remains retained therein by interlocking.

According to the embodiment shown in FIG. 2a, the upper and lower edges of the panel 22 further comprise grooves respectively indicated with 33 and 34, each of which comprises respective locking teeth 35 and 36.

The upper groove 33 allows the introduction and locking in the panel 22 of the module 20 of an upper grid mesh portion 21, while the lower grooves 34 allow a second level of modules to be arranged above a first level of modules 20, and in this case the groove 34 of the lower edge of each panel 22 of the second level receives and engages with the upper edge of the mesh grid panel 21 of the lower level. Such a configuration, which represents an advantageous embodiment of the invention, is illustrated in FIG. 12, which shows a multi-storey cage.

It should be noted that according to a preferred embodiment shown in FIG. 6, the base panel 24 is inserted by sliding it into the channel defined by the flaps of the border 23, so as to remain retained therein by interlocking. Further methods of retention can however be provided, which are to be considered as comprised in the scope of protection of the invention.

Figure 5:
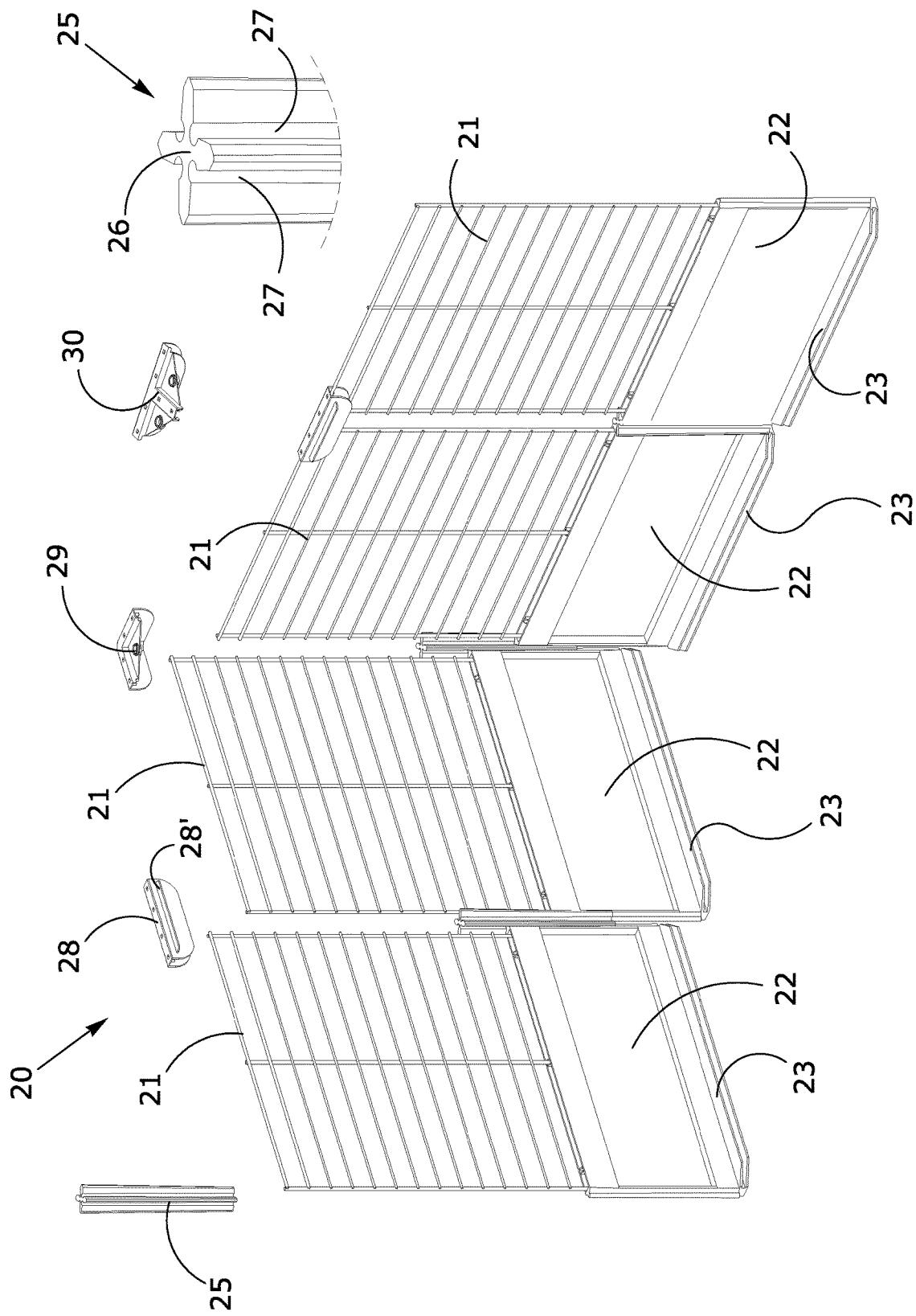
FIG. 5 shows a schematic view highlighting various modules arranged adjacently to each other and retained by connecting elements disposed at the vertical edges of the modules.

According to the embodiment shown in FIG. 5, the modular system according to the invention further comprises connection means between both the vertical edges of the adjacent panels and between the upper edges of the mesh grid portions 21 so as to be arranged in the same plane with each other or with angular arrangements.

More in particular, this connection means, as shown in FIG. 5, can comprise a first connector 25 of elongated shape and vertical alignment, which allows the adjacent retention between modules 20 which are adjacent to each other with a 90° and 180° arrangement or with other predetermined angular arrangements, for example 30°, 45° or 60°.

According to the embodiment shown in FIG. 5, the cross-section of this connector 25 has a cross-like shape 26 which defines four channels 27 each arranged at 90° with respect to the other and parallel to the vertical axis of the connector 25, for retaining the edges of the vertically adjacent modules. Each module edge has a shape adapted to be inserted and interlocked inside a respective channel 27.

Further connectors 28 form part of the connection means of the modular system according to the invention. Connectors 28 have a horizontally elongated shape and a cross-section in the vertical plane which is substantially an overturned "U" shaped, such as to allow the adjacent upper edges of the grid elements 21 to inserted therein and arranged at 180° to each other.

A further connection means of the modular system is represented by connectors 29 similar to the connectors 28 described above, but made according to a 90° angle so as to allow the adjacent upper edges of the mesh grid elements 21 to be inserted therein and arranged at 90° to each other.

Connection means of the modular system according to the invention is also represented by "T"-type connectors 30, adapted to allow the junction between the upper edges of three mesh grid elements 21, two of which arranged at 180° to each other and one at 90° in the embodiment illustrated.

Figure 8:
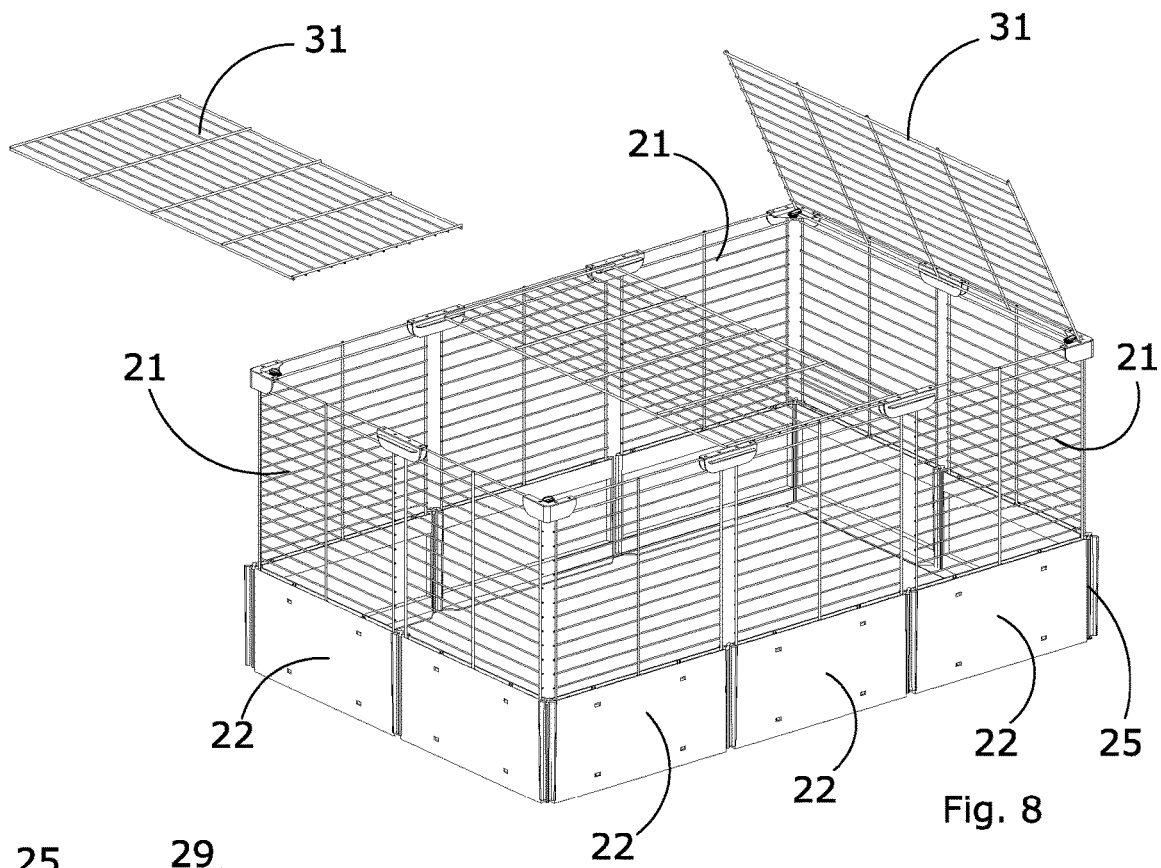
FIGS. 8 to 10 show views of a cage obtained by arranging modules adjacently and connecting the modules according to the invention, and of two respective angular connecting elements in two positions of use.
Figure 9:
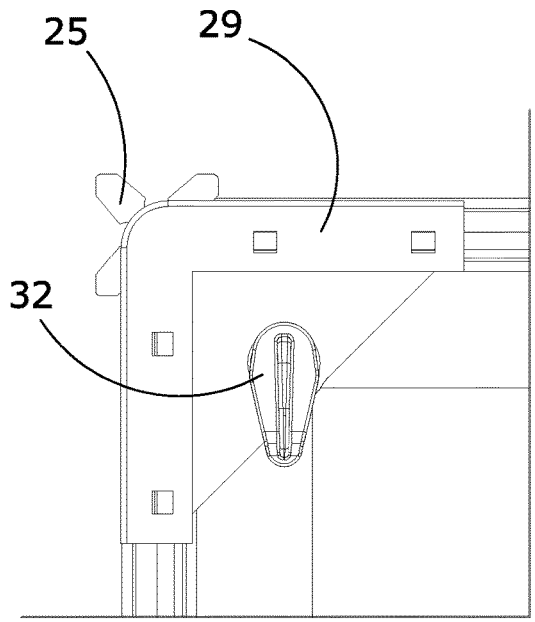

According to the embodiment shown in FIG. 8, the expandable modular frame according to the invention may comprise panels 31, either solid or mesh grid or both, which can be positioned horizontally in the upper part of the cage with the function of closing all or part of the upper part of the cage and forming a roof. Panels 31 can be supported by the connectors 28, 29 and 30 described above, and in some embodiments fastened thereto.

Figure 10:
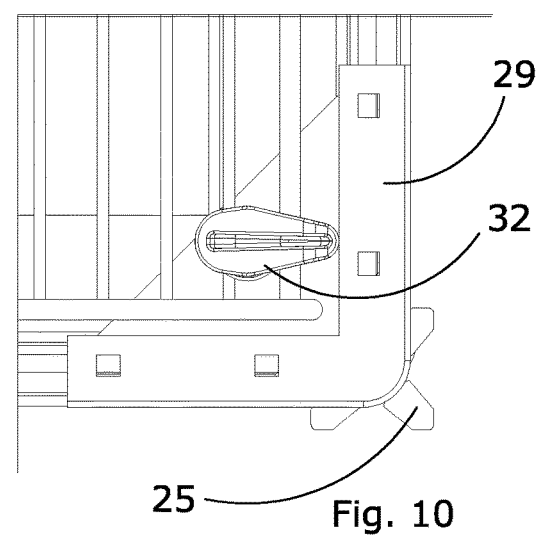
Figure 11:
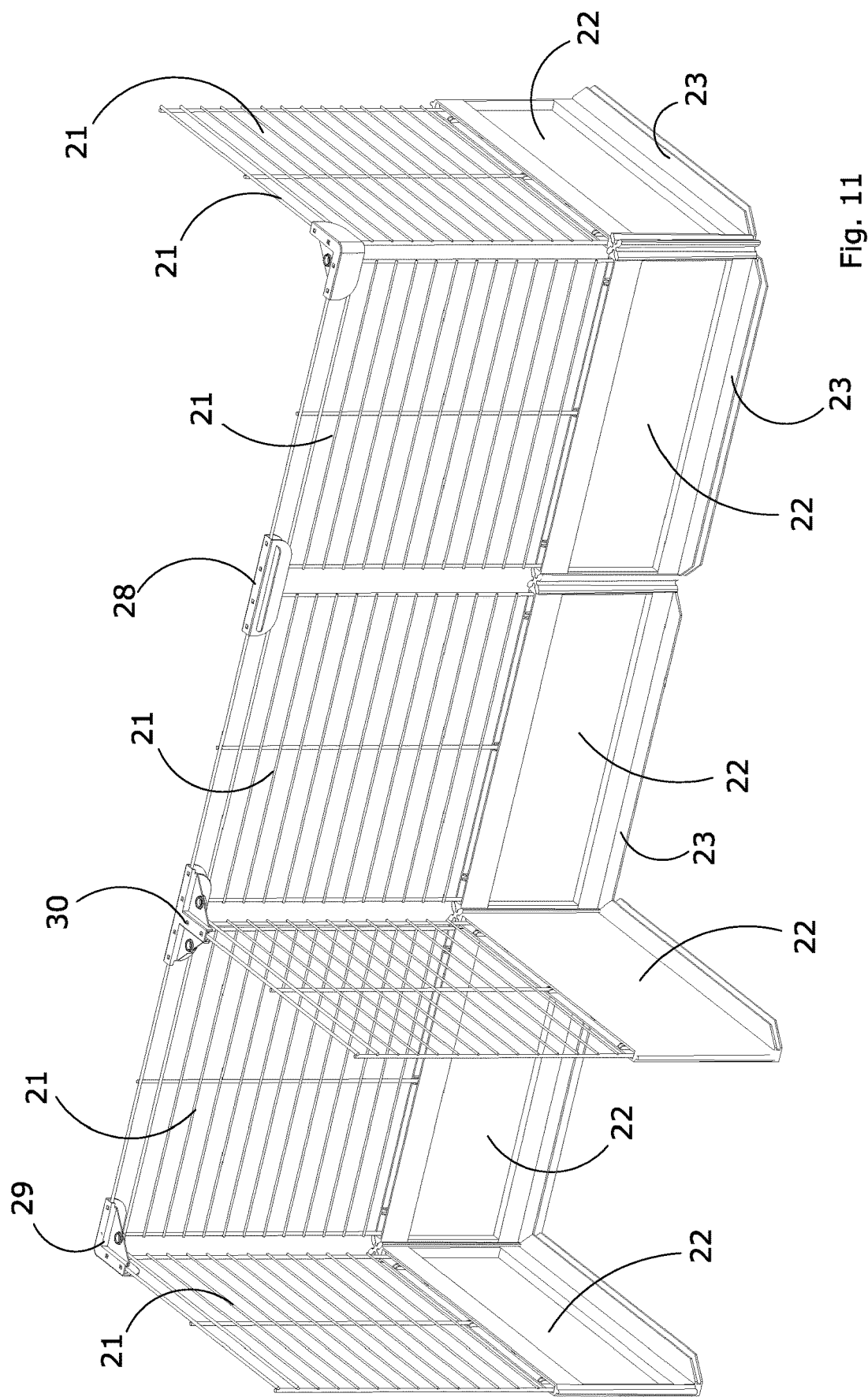
FIG. 11 shows a view of some modules arranged adjacently according to a further possible configuration obtained by arranging modules adjacently on a horizontal plane, said modules being retained by connecting elements of a different type.

For example, according to a further embodiment shown in FIGS. 10 and 11, the angular connectors 29 comprise a locking selector 32 which allows the retention of the grid panels 31 and locking them in this position through a 90° rotation thereof on a vertical axis. These locking selectors 32 can be provided in all the connectors 28, 29, 30 as described above.

According to further embodiments, it is also envisaged that the upper connectors 28, 29, 30 are provided with a horizontally arranged slat projecting towards the inside of the cage (or away from the inner surface of the module), and adapted to define a support element for the upper covering panels 31.

From an operational point of view, the assembly of a cage according to the invention is carried out according to a process which involves arranging adjacently to each other on a horizontal plane, according to various arrangements depending on needs, a plurality of modules 20 which remain retained, depending on the configurations, by a plurality of connectors 25 and/or 28 and/or 29 and/or 30 which act along the vertical edges of adjacent modules 20 to form a modular frame whose base is expandable as desired on said horizontal plane.

Depending on the configurations it is possible to insert one or more base trays of different dimensions substantially equal to the width of a module 20 or to multiples of the same, between the flaps forming the border 23, as can illustratively be seen in FIGS. 6 and 7.

Depending on the configurations, it is further possible to support on the upper part of the modular frame expandable to form a cage one or more panels 31 forming to form a roof or lid. It is also possible to lock the one or more panels 21 in this position by acting on the selector 32 present in the angular connectors 29 and/or on connectors 28 and 30.

FIGS. 11 to 14 show some embodiments of a modular frame expandable to form a cage according to the invention and in particular FIG. 11 shows some modules 20 arranged adjacently to each other according to some possible configurations on the horizontal plane, while FIG. 12 shows a cage formed on two levels and the upper horizontal edge of a module is connected to the lower horizontal edge of an overlying module. In this case a ladder 37 may be present inside the cage to allow the passage of the animal from one story to the other of the cage through an opening (not shown) in the base panel between one storey and the other of the cage.

FIG. 13 highlights the possibility of expanding the frame formed by the vertical modules on one side to form a cove, which is possibly repeatable on other sides. FIG. 14 shows a cage formed according to a square-base configuration with four equal sides, where each side of the cage is composed of two vertical and coplanar modules 20.

FIG. 15 shows a further embodiment of a modular frame expandable to form a cage according to the present invention, wherein there is a panel 42 disposed inside the cage, having a length equal to that of two adjacent modules 20 (but it is obviously possible to provide partitions of different width, such as for example equal to that of a module or to a multiple of the width of a module), and in this case provided with an opening 44 which allows the passage of an animal from one portion to another of the cage. The panel 42 is further shown in FIG. 17. FIG. 15 also shows a further panel 42', made identically to the panel 42 used as an internal partition of the cage. The panels 42, 42' may be provided with a removable door 40, which allows the passage of the animal through an opening 44, as shown in FIGS. 15 and 17.

Finally, FIG. 18 shows a further coupling between adjacent modules through a connector 25 of the type described above, as well as a further connector 43 which joins together the vertical edges of two respective adjacent mesh grid portions 21 of the modules. FIG. 19 shows the connector 43 in greater detail formed by a tubular-shaped element made of plastic material open on one side, and kept elastically closed so as to be able to retain therein said vertical edges of the mesh grid portions 21 of adjacent modules 20.

As can be noted, the modular frame expandable to form a cage according to the invention offers a wide possibility of configurations and possible enlargements which can be chosen from time to time according to needs, thanks to the fact that the base frame of the cage is formed exclusively by connecting elements between vertical modules arranged adjacently to each other on a horizontal plane.

The invention has been described in the foregoing with reference to a preferential embodiment thereof. However it is clear that the invention is susceptible to numerous variants which fall within the scope thereof, and which are technically equivalent.

The invention claimed is:

1. A module for use in an expandable modular frame to form a pet's cage, the module comprising:
    a substantially quadrangular vertical wall comprising a lower vertical wall portion comprising a closed panel made of plastic material and an upper vertical wall portion comprising a metallic mesh grid panel releasably attached to the closed panel; wherein
        the closed panel comprises a pair of vertical edges, with one vertical edge disposed on each side of the closed panel, each vertical edge having a predefined shape;
        an upper horizontal edge of said closed panel and a lower horizontal edge of said closed panel each comprise a groove, and each respective groove comprises a respective locking tooth;
        a lower horizontal edge of the metallic mesh grid panel is received into and removably retained within the groove in the upper horizontal edge of the closed panel and the groove in the upper horizontal edge of said closed panel is configured to retain the metallic mesh grid in vertical alignment with said closed panel; and
        the groove in the lower horizontal edge of said closed panel is configured to receive and removably retain an upper horizontal edge of a second metallic mesh grid of a second module so that the second metallic mesh grid is in vertical alignment with said closed panel;
    a border formed integral with the closed panel and disposed proximate the lower horizontal edge of the closed panel, the border projecting orthogonally away from an interior side of the closed panel, the border comprising a pair of parallel vertically spaced apart flaps which define a channel configured to receive and removably retain one or more base panels in a horizontal arrangement; and
    a plurality of connecting elements configured to removably connect an edge of the module to an edge of a third module disposed adjacent to the module on a horizontal plane; wherein
        the connecting elements comprise a first connector of elongated shape with a vertical axis, the first connector being elongated along the vertical axis and configured to removably couple one of the vertical edges of the closed panel to a vertical edge of a closed panel of a lower vertical wall portion of the third module at a predefined angle;
        the first connector of elongated shape has a cross-section of a cross-like shape that defines four channels each spaced 90° with respect to two of the other channels, the lengthwise axis of each channel being parallel to the vertical axis of the first connector and each channel extending from a first end of the first connector to a second opposite end of the first connector; and
        the four channels of the first connector of elongated shape are each configured to slidably receive and interlock with one of the vertical edges of the closed panel of the lower vertical wall portion of the module.

2. The module according to claim 1, wherein each of the vertical edges of the closed panel have a shape adapted to be slidably inserted into one of the four channels in the vertical direction while being interlocked inside the channel in a direction parallel to the horizontal plane once inserted.

3. The module according to claim 2, wherein each of the four channels of the first connector of elongated shape are each of sufficient length to slidably receive and interlock with the entire length of one of the vertical edges of the closed panel.

4. The module according to claim 2, wherein the module is configured for use in forming a single, expanded pet's cage.

5. A module for use in an expandable modular frame to form a pet's cage, the module comprising:
    a) an upper vertical wall portion comprising a metallic mesh grid panel having an upper horizontal edge and a lower horizontal edge; and
    b) a lower vertical wall portion comprising a closed panel made of plastic material and having:
        i) a lower horizontal edge;
        ii) two vertically-extending edges, each vertical edge having a predefined shape;
        iii) an upper horizontal edge comprising a groove with a locking tooth disposed therein configured to receive and removably retain the lower horizontal edge of the metallic mesh grid panel within the groove so as to form a four-sided vertical wall when the lower horizontal edge of the metallic mesh grid panel is received within the groove of the upper horizontal edge of the closed panel; and
        iv) an integrally formed border disposed proximate to the lower horizontal edge of the closed panel, the border projecting inwardly away from a vertically-extending flat interior side of the closed panel and comprising a pair of parallel vertically spaced apart flaps which define a channel configured to receive and removably retain one or more base panels in a horizontal arrangement; and
        v) the vertically-extending flat interior side positioned above the border;
    c) a plurality of elongated closed panel connectors, each elongated closed panel connector being elongated along a vertical axis and comprising a plurality of parallel vertically-extending channels, wherein one of the plurality of vertically-extending channels extends from a first end of the elongated closed panel connector to a second end and is configured to slidably receive and interlock with one of the two vertically-extending edges of the closed panel, and wherein a second of the plurality of vertically-extending channels extends from a first end of the elongated closed panel connector to a second end and is configured to slidably receive and interlock with a vertically-extending edge of another closed panel of a second module disposed adjacent to the module on a horizontal plane, and wherein the plurality of vertically-extending channels are arranged at predefined angles with respect to each other.

6. The module according to claim 5, wherein the predefined angles are selected from the group consisting of 30 degrees, 45 degrees, 60 degrees, 90 degrees, and 180 degrees.

7. The module according to claim 6, wherein the predefined angles are 90 degrees, and the closed panel connector defines four vertically-extending parallel channels and each channel in cross section has a channel opening that is narrower than another portion of the channel.

8. The module according to claim 5, further comprising a second metallic mesh grid panel having an upper horizontal edge and a lower horizontal edge, wherein the lower horizontal edge of the closed panel comprises a groove and locking tooth configured to receive and removably retain the upper horizontal edge of the second metallic mesh grid panel within the groove so as to form a two-story vertical wall.

9. The module according to claim 5, wherein each of the vertically-extending channels of each closed panel connector is of sufficient length to slidably receive and interlock with the entire length of one of the vertically-extending edges of the closed panel.

10. The module according to claim 5, wherein the module is configured for use in forming a single, expanded pet's cage.

* * * * *